(12) United States Patent
Stock et al.

(10) Patent No.: US 11,535,163 B2
(45) Date of Patent: Dec. 27, 2022

(54) CLOSURE UNIT FOR A STORAGE COMPARTMENT, STORAGE COMPARTMENT

(71) Applicant: Volkswagen Aktiengesellschaft, Wolfsburg (DE)

(72) Inventors: Christian Stock, Wolfsburg (DE); Christopher Neumann, Wasbuettel (DE); Burkhard Gis, Ruehen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 95 days.

(21) Appl. No.: 17/129,124

(22) Filed: Dec. 21, 2020

(65) Prior Publication Data

US 2021/0188181 A1    Jun. 24, 2021

(30) Foreign Application Priority Data

Dec. 20, 2019   (DE) .................... 10 2019 220 345.0

(51) Int. Cl.
    *B60R 7/04*        (2006.01)

(52) U.S. Cl.
    CPC ..................... *B60R 7/04* (2013.01)

(58) Field of Classification Search
    CPC ................................. B60R 7/04; E05B 83/32
    USPC .......................... 296/24.34, 37.1, 37.8, 24.46
    See application file for complete search history.

(56) References Cited

U.S. PATENT DOCUMENTS

| | | | |
|---|---|---|---|
| 6,168,059 B1 * | 1/2001 | Salenbauch | B60R 7/04 220/345.5 |
| 6,478,204 B2 * | 11/2002 | Lange | B60R 7/04 224/555 |
| 6,499,785 B2 * | 12/2002 | Eguchi | B60R 7/04 224/539 |
| 7,007,994 B2 * | 3/2006 | Kubota | B60R 7/04 296/24.34 |
| 10,106,092 B2 | 10/2018 | Huebner et al. | |

(Continued)

FOREIGN PATENT DOCUMENTS

| | | |
|---|---|---|
| DE | 198 56 979 A1 | 3/2000 |
| DE | 10 2015 113 395 A1 | 2/2017 |
| DE | 10 2018 102 625 A1 | 8/2018 |

OTHER PUBLICATIONS

German Search Report for German Application No. 10 2019 220 345.0 dated Sep. 1, 2020 with English translation.

*Primary Examiner* — D Glenn Dayoan
*Assistant Examiner* — E Turner Hicks
(74) *Attorney, Agent, or Firm* — Muncy, Geissler, Olds & Lowe, P.C.

(57) ABSTRACT

A closure unit for a storage compartment, in particular of a motor vehicle, with a frame that forms an access opening for the storage compartment, with two closure elements arranged displaceable on the frame, wherein the closure elements each close a different part of the access opening in a closed position and together close the entire access opening in their respective closed position, and wherein a handle for manually moving the closure elements is disposed at the mutually facing ends of the closure elements. It is provided that the closure elements each have an off-center projection at their mutually facing ends, on which the respective handle is disposed, such that the handles in the closed position of both closure elements are arranged in a line transverse to the sliding direction of the closure elements.

14 Claims, 2 Drawing Sheets

(56) References Cited

U.S. PATENT DOCUMENTS

2005/0189776 A1  9/2005  Sturt
2018/0118121 A1  5/2018  Gorman, Jr.

* cited by examiner

CLOSURE UNIT FOR A STORAGE COMPARTMENT, STORAGE COMPARTMENT

This nonprovisional application claims priority under 35 U.S.C. § 119(a) to German Patent Application No. 10 2019 220 345.0, which was filed in Germany on Dec. 20, 2019, and which is herein incorporated by reference.

BACKGROUND OF THE INVENTION

Field of the Invention

The present invention relates to a closure unit for a storage compartment, in particular of a motor vehicle, with a frame that forms an access opening for the storage compartment, with two closure elements arranged displaceable on the frame, wherein the closure elements each close a different part of the access opening in a closed position and together close the entire access opening in their respective closed position, and wherein a handle for manually moving the closure elements is disposed at the mutually facing ends of the closure elements.

Further, the invention relates to a storage compartment for a motor vehicle, with a receiving well for objects and with a closure unit, associated with the receiving well, for releasing or closing the receiving well.

Description of the Background Art

Closure units of the aforementioned type are known from the prior art. Thus, for example, the published patent application US 2018/0118121 A1 discloses a generic closure unit for a storage compartment in a central armrest of a motor vehicle. The closure elements are designed as flexible roller blinds and each have a handle on their mutually facing ends. The closure elements are mounted displaceable independently of one another in the frame in order to release or close a section of the frame opening or the access opening, wherein the free ends can also be pushed against one another such that the entire access opening is closed by the two closure elements. The user thus has the option of releasing only part of the storage compartment in a simple manner or, as needed, of releasing or closing the entire storage compartment.

DE 198 56 979 A1, which corresponds to U.S. Pat. No. 6,168,059, further discloses a storage compartment with a closure unit, which likewise has two closure elements displaceable independently of one another. However, only one handle is associated with the two closure elements, which can be optionally coupled to one or to the other closure element.

SUMMARY OF THE INVENTION

It is therefore an object of the present invention to provide an improved closure unit for a storage compartment, which allows simple and intuitive handling of the closure elements and is at the same time space-saving and of high quality visually.

The object underlying the invention is achieved by a closure unit in that each closure element is provided with its own handle, the handles in the closed position of both closure elements visually act like a single handle. In the closed state of the closure unit, the user thus initially has the visual impression of a single handle, but there is no individual coupling of the handle to one or to the other closure element; instead, two handles are actually available. As a result, on the one hand, the robustness of the closure unit is increased, the visual impression is improved, and, at the same time, simple operability of both closure elements is ensured. According to the invention, this is achieved in that the closure elements each have an off-center projection at their mutually facing ends, in particular with respect to a longitudinal central axis of the closure elements; the respective handle is disposed on the projection such that these handles in the closed position of both closure elements are arranged in a line transverse to the sliding direction or longitudinal central axis. It is achieved due to the off-center projection that the closure elements with the handles overlap laterally in some areas when both closure elements are in their closed position. As a result, the handles can be pushed to the same level in relation to the longitudinal central axis of the frame and visually form a handle which extends transverse to the longitudinal central axis of the closure unit.

Furthermore, it can be provided that the closure elements are mounted movable in the same plane. In the closed position, the closure elements thereby form a continuous cover for the storage compartment and, in particular, also use the same guide system on the frame, so that a space-saving and cost-saving realization of the closure unit is ensured.

The respective projection can extend as an extension of the respective closure element in the direction of the opposite closure element. As a result, in the closed position of both closure elements, the handles lie next to one another or, as already described above, at a level relative to the longitudinal central axis of the closure unit. Optionally, the respective projection also protrudes vertically from the respective closure element such that it covers the respective other closure element in the closed position so that the projections can be pushed over the respective other closure element in order to then lie in a common line. Alternatively, the respective projection extends only as an extension of the respective closure element, so that the projections of the closure elements only lie adjacent to one another in the closed position of both closure elements and in particular completely fill the space between the closure elements in order to completely close the closure unit.

Furthermore, the respective handle can be arranged or designed as a web-shaped grip strip on the respective projection. The grip strip can be easily produced and allows easy operation of the closure elements. In particular, the grip strip can advantageously be aligned so that a visually continuous handle results in the closed position of both closure elements. Alternatively, the respective handle is preferably designed as an elongated recessed grip.

The respective closure element can be designed as a roller blind. This results in simple storage of the closure element in its open position, so that installation space advantages result. Alternatively, the respective closure element is preferably designed as a displaceable or pivotable and/or displaceable cover.

The frame can have two mutually opposite guide grooves in which the closure elements are each mounted guided with their side edges. This results in a simple and secure guidance of the closure elements in one plane, in particular also when they are designed as a roller blind.

The closure elements are preferably designed complementary to one another on mutually facing end faces in order to form a closed joint. This means that when the closure elements are pushed together in their respective closed position, a closing of the entire storage compartment so that it is shielded from view is ensured. Due to the complementary design, preventing a light gap between the closure elements in the particular closed position in the pushed-together state is easy to realize.

For this purpose, it is particularly preferred that one closure element has an end face formed concave at least in areas and the other closure element has an end face formed convex at least in areas and associated with the concave end face. In the pushed-together state, the convex end face therefore lies in areas within the concave end face, as a result of which a light gap is advantageously prevented. Furthermore, it is preferably provided that the projections are formed in one piece with the respective closure element. This results in a simple and robust design of the closure unit.

Alternatively, the handles are attached as separate components to the respective projection. This makes possible a simple visual adaptation of the handles to different motor vehicles or different vehicle fittings, for example.

Further, the storage compartment of the invention is characterized by the design of the closure unit according to the invention. The aforementioned advantages result therefrom.

The closure elements can preferably be displaced independently of one another on the frame, so that one closure element can be moved into the open position, for example, while the other closure element remains in the closed position. According to an alternative embodiment, the closure elements are in particular mechanically coupled to one another such that the displacement of one of the closure elements also leads to a displacement of the other of the closure elements. As a result, the access opening of the storage compartment can be easily completely released and closed by actuating only one of the closure elements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
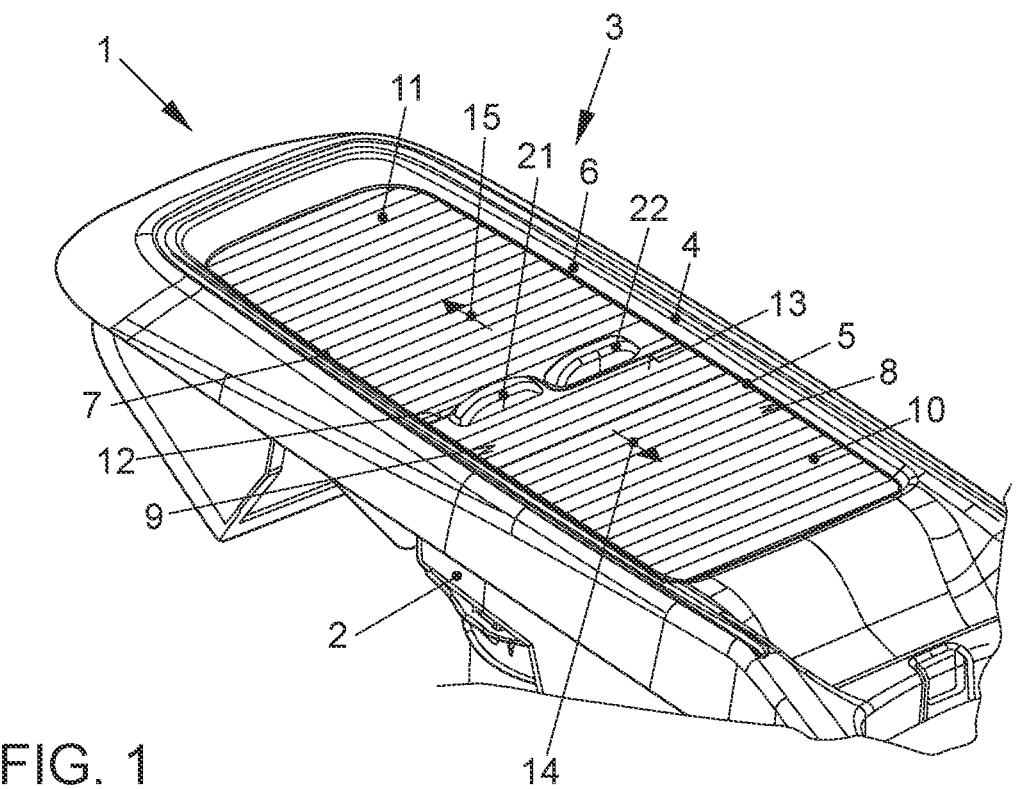
FIG. 1 shows an exemplary storage compartment in a perspective view.

FIG. 1 shows, in a perspective view, an advantageous storage compartment 1 for a motor vehicle, in particular for a center console of a motor vehicle. Storage compartment 1 has a receiving well 2 for receiving and storing objects, wherein receiving well 2 is designed to be open at the top in the intended mounted state. This opening is associated with a closure unit 3 by means of which access to receiving well 2 can be released or closed. For this purpose, closure unit 3 has a frame 4 which rests on the side edges of receiving well 2. Frame 4 forms an access opening 5 to receiving well 2. In this regard, frame 5 has a guide groove 8, 9 on each of two opposite long sides 6 and 7, wherein guide grooves 8, 9 are oriented parallel to one another. Closure unit 3 further has two closure elements 10, 11, which are each designed as roller blinds. Closure elements 10, 11 are each displaceably mounted with their side edges in one of guide grooves 8, 9 such that together they can completely close access opening 5, as shown in FIG. 1. In this state, both closure elements 10, 11 are moved in guide grooves 8, 9 such that they bear against one another with their mutually facing end faces 12, 13 and each close a section of access opening 5 or of storage compartment 1. If closure elements 10, 11 are moved away from one another, as indicated by arrows 14, 15, access opening 5 is opened and storage compartment 1 is released. In this case, closure elements 10, 11 can be moved independently of one another. Due to guide grooves 8, 9, closure elements 10, 11 are preferably arranged or oriented in a common plane in frame 4, so that they lie at the same level in relation to one another and in the closed state, as shown in FIG. 1, form an at least substantially continuous surface.

Figure 2:
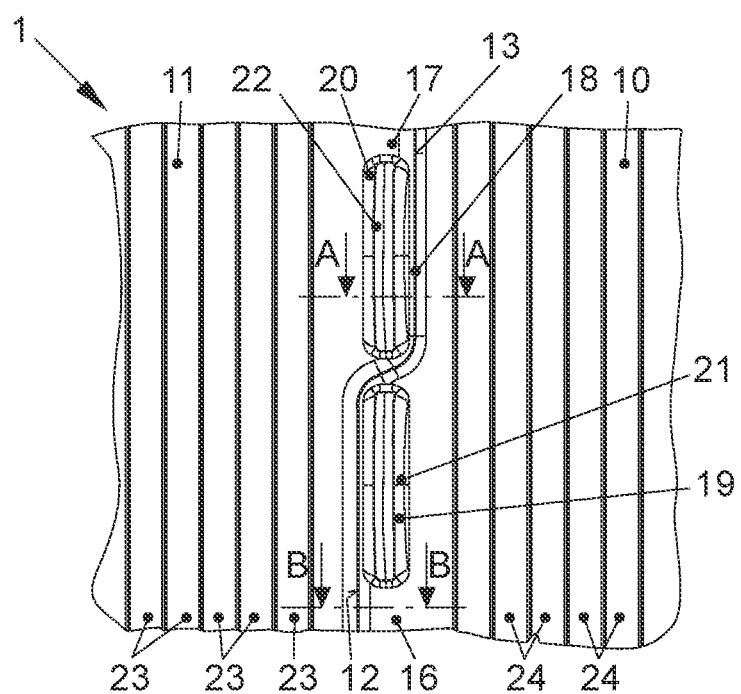
FIG. 2 is a plan view of the storage compartment.

FIG. 2 shows a plan view of storage compartment 1 in the area of end faces 12, 13 of closure elements 10, 11. Both closure elements 10, 11 have a projection 16, 17 which extends as an extension of the respective closure element 10, 11.

Projections 16, 17 thus extend in the plane of guide grooves 8, 9 and each in the direction of the opposite closure element 11, 10. In this regard, projections 16, 17 are formed complementary to one another, so that closure elements 10, 11 in the shown closed position completely close access opening 5 and bear against one another over the entire width. A continuously closed joint 18 thus results.

Each projection 16, 17 has a handle 19, 20. According to a present exemplary embodiment, the handles are designed as web-shaped grip strips 21 or 22, which protrude vertically from the respective closure element 10, 11, namely on the upper side of closure elements 10, 11, said side facing away from receiving well 2. Grip strips 21, 22 are arranged on projections 16, 17 such that they are aligned with one another in a straight line in the closed position of closure elements 10, 11. Joint 18 preferably runs, as shown in FIG. 2, between the two grip strips 21, 22.

Figure 3:
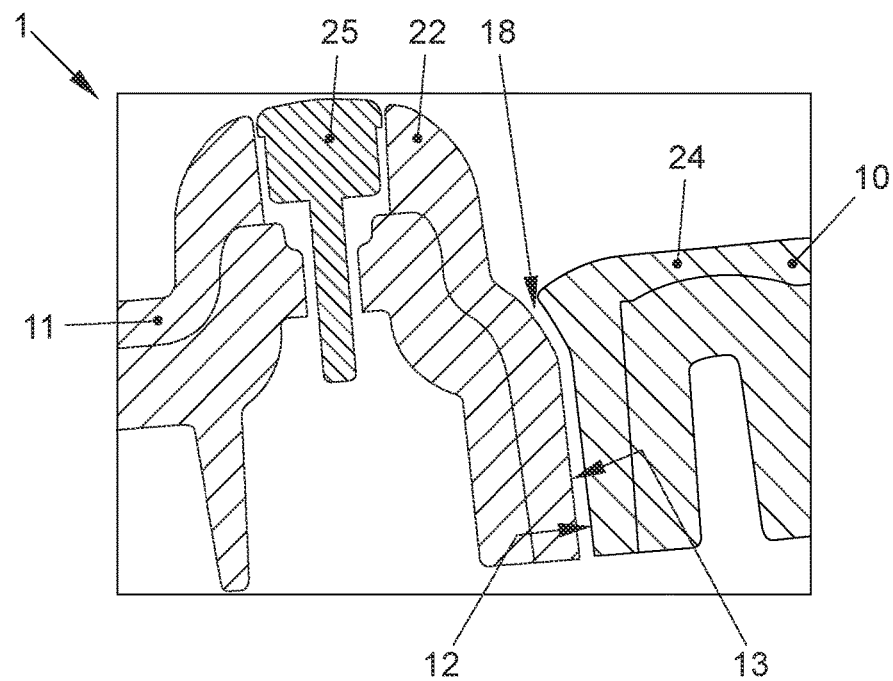
FIG. 3 is a first longitudinal sectional view through the closure unit.

FIG. 3 shows a longitudinal sectional view through closure unit 3 along the line A-A from FIG. 2. In the area of joint 18, the mutually facing end faces 12 and 13 are formed complementary to one another such that a non-see-through joint is created, so that therefore one cannot see into the storage compartment from the outside when closure elements 11, 10 are both in the closed position, as shown in FIG. 1. For this purpose, end face 13 of closure element 11 is formed convex in areas and end face 12 of closure element 10 complementary thereto is concave in areas, so that closure elements 10, 11 overlap in areas in the closed position of both closure elements 10, 11, so that a visible gap is prevented and an incidence or emission of light is at least largely changed.

Figure 4:
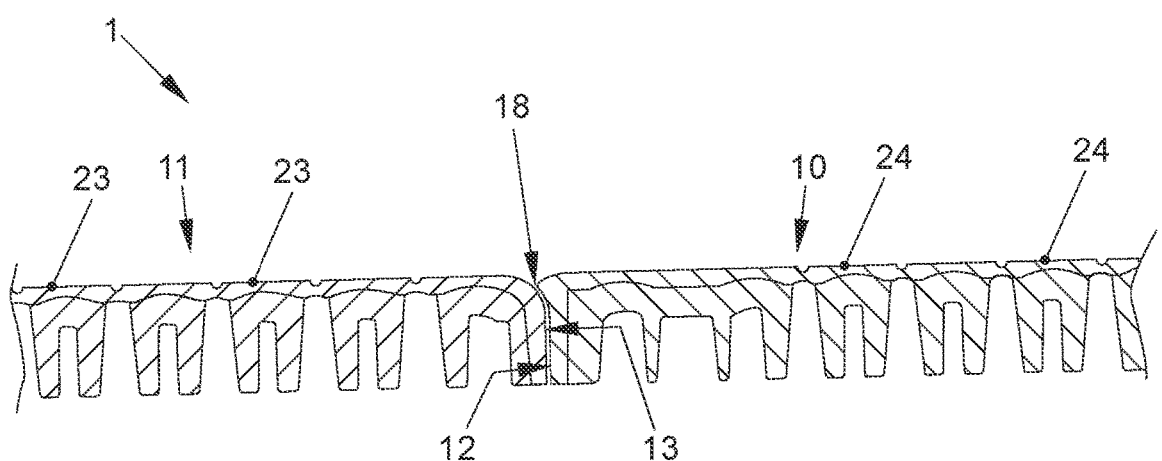
FIG. 4 is a second longitudinal sectional view through the closure unit.

FIG. 4 also shows a longitudinal sectional view through closure unit 3 but along the line B-B from FIG. 2. Here, as well, the complementary design of end faces 12, 13 to one another can be seen. The design of the closure elements as roller blinds can likewise be seen, which have multiple slats 23 or 24 flexibly connected to one another, which enable the respective closure element 10, 11 to roll up at a distance from access opening 5.

As also shown in FIG. 3, grip strips 21, 22 are optionally designed with an insert element 25, which is designed in particular as a light guide or as a light, by means of which the respective handle 19, 20 can be illuminated, for example, to make it easier for the user to grasp the respective handle in the dark.

Whereas, according to the present exemplary embodiment, projections 16, 17 each only extend as an extension of the respective closure element 10, 11, so that projections 16, 17 of closure elements 10, 11 only lie next to one another in the closed position of both closure elements 10, 11, therefore, bear against one another on the end faces at the end edges, it is provided according to a further exemplary embodiment that the respective projection 16, 17 also protrude vertically from the respective closure element 10, 11 such that it covers the other closure element 11, 10 in the closed position of both closure elements 10, 11. As a result, projections 16, 17 can be pushed over the respective other closure element 11, 10 when the closure elements are moved into the closed position, in order then to lie in a common line. The closure elements thereby mutually overlap in the closed position.

It is achieved by the advantageous design of closure unit 3 that the user can release storage compartment 1 in areas as needed by moving only one of closure elements 10, 11 into an open position. In addition, a high-quality impression is imparted because grip strips 21, 22 extend in a line transverse to the sliding direction and thus initially act like a single actuating handle in the closed position of both closure elements 10, 11. A closed joint or a tight closure of access opening 5 is made possible by the advantageous design of closure elements 10, 11, and a cost-effective and robust realization of closure unit 2 is provided.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A closure unit for a storage compartment of a motor vehicle, the closure unit comprising:
   a frame that forms an access opening for the storage compartment;
   two closure elements arranged displaceable on the frame, the two closure elements each close a different part of the access opening in a closed position and together close the entire access opening in their respective closed position; and
   handles for manually moving the two closure elements, a respective one of the handles being disposed at each of mutually facing ends of the two closure elements,
   wherein the two closure elements each have an off-center projection at the mutually facing ends, on which the respective one of the handles is disposed, such that in the closed position of both of the two closure elements, the handles are arranged in a line transverse to a sliding direction of the two closure elements, and
   wherein one of the two closure elements has an end face formed concave at least in areas of the mutually facing end with the off-center projection and areas of the mutually facing end without the off-center projection and the other of the two closure elements has an end face formed convex at least in areas of the mutually facing area with the off-center projection and areas of the mutually facing end without the off-center projection and which is associated with the concave end face.

2. The closure unit according to claim 1, wherein the two closure elements are mounted movable in a same plane.

3. The closure unit according to claim 1, wherein each respective off-center projection extends as an extension of a respective one of the two closure elements in a direction toward the other of the two closure elements.

4. The closure unit according to claim 1, wherein each respective off-center projection extends only as an extension of a respective one of the two closure elements.

5. The closure unit according to claim 1, wherein each respective off-center projection protrudes vertically from a respective one of the two closure elements so as to cover the respective other of the two closure elements in the closed position.

6. The closure unit according to claim 1, wherein each respective handle is arranged or designed as a web-shaped grip strip or as a longitudinally extending grip recess on or in each respective off-center projection.

7. The closure unit according to claim 1, wherein each of the two closure elements are designed as a roller blind or a cover.

8. The closure unit according to claim 1, wherein the frame has two mutually opposite guide grooves in which side edges of the two closure elements are mounted and guided.

9. The closure unit according to claim 1, wherein the two closure elements are designed complementary to one another on the mutually facing ends in order to form a closed joint.

10. The closure unit according to claim 1, wherein the off-center projections are formed in one piece with the two closure elements, respectively.

11. The closure unit according to claim 1, wherein the handles are formed in one piece with the off-center projections, respectively.

12. The closure unit according to claim 1, wherein the handles are attached as separate components to the off-center projections, respectively.

13. The closure unit according to claim 1, wherein the two closure elements are arranged displaceable independently of one another on the frame.

14. A storage compartment for a motor vehicle, the storage comprising:
   a receiving well for objects; and
   the closure unit according to claim 1, the closure unit being associated with the receiving well for releasing or closing the receiving well.

\* \* \* \* \*